United States Patent [19]
Hsu

[11] Patent Number: 5,473,739
[45] Date of Patent: Dec. 5, 1995

[54] METHOD OF PREPROCESSING A MAP TO PRODUCE SIMPLIFIED, DIGITALLY-STORED DATA FOR SUBSEQUENT PROCESSING AND RESTORATION OF SAME

[76] Inventor: Shin-yi Hsu, 2312 Hemlock La., Vestal, N.Y. 13850

[21] Appl. No.: 866,626

[22] Filed: Apr. 10, 1992

Related U.S. Application Data

[63] Continuation-in-part of Ser. No. 410,198, Sep. 21, 1989, abandoned.

[51] Int. Cl.$^6$ .......................................................... G06T 9/00
[52] U.S. Cl. ............................ 395/134; 395/129; 395/141
[58] Field of Search ..................................... 395/125–127, 395/129–132, 133–136, 140–143; 358/75, 426; 382/21, 22, 25, 56; 353/5–11

[56] References Cited

U.S. PATENT DOCUMENTS

| | | |
|---|---|---|
| 3,743,765 | 7/1973 | Maier ........................................ 358/426 |
| 3,778,541 | 12/1973 | Bowker ...................................... 358/75 |
| 3,883,861 | 5/1975 | Heartz ..................................... 353/11 X |
| 4,375,654 | 3/1983 | Evans et al. ........................... 382/21 X |
| 4,729,137 | 3/1988 | Chan et al. ................................ 382/56 |
| 4,998,212 | 3/1991 | Dedieu et al. ....................... 395/135 X |

*Primary Examiner*—Almis R. Jankus
*Attorney, Agent, or Firm*—Salzman & Levy

[57] ABSTRACT

A method of digitally redefining an image is disclosed to simplify the storage and processing required to recreate the image. The image is redefined in greatly reduced digital form. The digital information representing commonly bounded image regions is reduced to only a few digits by recoding the image. An image is optically digitized to fingerprint an interior portion of a region and its boundary. At least one point on the boundary has predetermined coordinate values. The region boundary, the interior portion and the point on the boundary are respectively distinguished from one another by at least three optically distinctive tones. The tones may be colors or shades of gray, with each carrying only one or two digits of information. The data is stored in a storage device for subsequent retrieval or analysis.

23 Claims, 1 Drawing Sheet

METHOD OF PREPROCESSING A MAP TO PRODUCE SIMPLIFIED, DIGITALLY-STORED DATA FOR SUBSEQUENT PROCESSING AND RESTORATION OF SAME

RELATED APPLICATION

This application is a continuation-in-part of prior U.S. patent application Ser. No. 07/410,198, which was filed on Sep. 21, 1989, now abandoned.

FIELD OF THE INVENTION

The present invention relates to a prescanning technique for coding information on a map to simplify the amount of data required to store same, and for simplifying the processing required to restore the map, and, more particularly, to a method featuring a "man-in-the-loop" technique of creating simplified digital data which is representative of commonly bounded images, such as geographical regions of a map to be subsequently recreated by computer processing.

BACKGROUND OF THE INVENTION

As computers are used more frequently to store, retrieve and analyze data, and as devices for storing data become increasingly larger and more efficient, it is now commonplace that new uses for computers are always being discovered. In the fields of graphics representation and image processing in particular, faster processors (coupled with memories having ever greater capacities) are engaged to solve problems of image analysis and storage.

Efficient processors and large memory devices are especially important in the field of image processing. An image comprises many regions, each of which is normally characterized in some manner and digitized so that a numerical value representative of each region can be derived, transformed, stored and retrieved at a later time for purposes of display or further processing. The smallest usable portion of an image is called a "pixel" (derived from "picture element"). An image is conventionally divided into one or more matrices of pixels, with each pixel having a unique location or address with respect to the boundaries of the image. The larger the image or the finer the pixels, the greater the capacity needed for a device to store data representative of the complete image. The need for processing units with improved efficiency proportional to an increased memory capacity is obvious.

One approach to processing an image is disclosed in "Intermediate-Level Vision—Building Vertex-String-Surface (V-S-S) Graphs" by C. Jacobus et al., *Computer Graphics and Image Processing*, Vol. 15, pp. 339–363 (1981), in which algorithms are presented for region aggregation, boundary string following and vertex detection and reconstruction. The image must be processed by means of a relatively complex computation which is, unfortunately, error-prone and time-consuming. Boundaries and their curvatures must be detected; to correct for discontinuities, the intermediate image and values must be edited either in post-processing or by utilizing graphic editing steps. The aforementioned system, as well as others relying on intense computation, represents the sort of cumbersome, often unacceptably inaccurate methods of digitizing and storing images that the present invention is meant to replace.

While the mere number of pixels in an image is a significant factor in predicting memory capacity, the quantity alone is not determinative. Along with the address of each pixel, there must be stored a qualitative value, such as the darkness, lightness or gray level of the pixel (if a black-and-white image is considered), or the color, tone or tint of the pixel (if a color image is considered). For these reasons, it should be understood that extraordinary amounts of data must be processed and stored, especially when large images or a plurality of images are handled.

In certain fields (such as real estate tax mapping, satellite photography and engineering schematics, for example), it is not unusual to handle thousands of images in a short period of time. In some cases, the amount of data representing a map to be recreated by computer processing is so great that even powerful "number-crunching" techniques are not adequate to accurately recreate the map. It is, therefore, desirable to redefine the map in a more simplified manner, i.e., by using a recoding technique to digitally define the map, using less information. Such a system that can deal adequately with complex image processing problems by using less digital data to define multiple maps, photographs and drawings would obviously be of great value.

In accordance with the present invention, there has been developed a method to recoat maps, using a "man-in-the-loop" technique. This new technique is a prescanning, "man-in-the-loop" method in which the various regions of a map are redefined, or recoated with simplified color coordinates designating boundary lines, and vertex coordinates defining map regions. In this manner, the amount of data necessary to recreate the map is greatly lessened. This not only reduces the amount of information that needs to be stored, but also eliminates or greatly reduces the amount of processing needed to recreate the map.

It would be advantageous to store data representative of an image in such a way so as to save processing time over and above the time spent utilizing conventional techniques.

It would also be advantageous to store data representative of an image in such a way so as to minimize the amount of data needed to recreate the stored image.

It would be a further advantage to provide a "man-in-the-loop" system capable of recoding a map with a minimum of digital information, whereby images can be digitized, stored and recreated without requiring undue memory or processing capacity.

SUMMARY OF THE INVENTION

In accordance with the present invention, there is provided a "man-in-the-loop" method of digitally redefining an image to simplify the storage and processing required to recreate the image. The image is redefined in greatly reduced digital form. The digital information representing commonly bounded image regions is reduced to a few digits by recoding the image. An image is optically digitized to fingerprint an interior portion of a region and its boundary. At least one point on the boundary has predetermined coordinate values. The region boundary, the interior portion and the point on the boundary are respectively distinguished from each other by at least three optically distinctive tones. The tones may be colors or shades of gray, with each carrying only one or two digits of information. The data is stored in a storage device for subsequent retrieval or analysis.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Generally speaking, the present invention features a prescanning technique for recoding a map or image containing many regions requiring digital definition. The recoated map or image is digitally defined by a greatly reduced amount of information, thus reducing the amount of storage and processing required to recreate the map or image.

Figure 1:
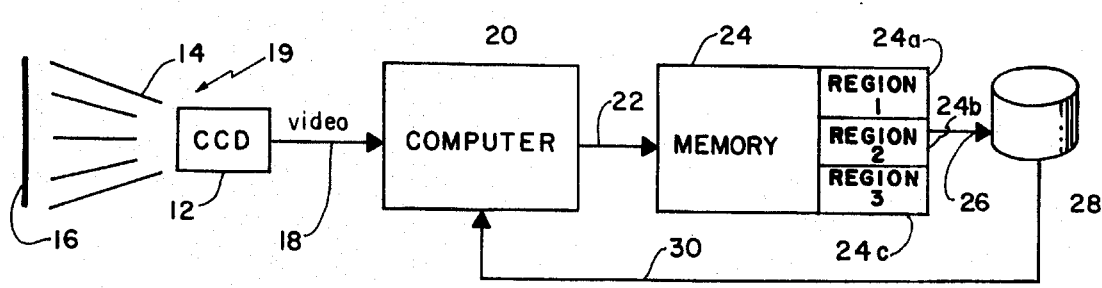
FIG. 1 is a block diagram depicting apparatus used to carry out the inventive method of the present invention.

Referring now to FIG. 1, there is shown a block diagram of apparatus in accordance with the preferred embodiment used to carry out the inventive method of the present invention. It should be understood, however, that other suitable apparatus may be used to accomplish the inventive method without departing from the scope of the present invention.

An image processing system, shown generally at reference numeral 10, has a CCD device 12 with suitable lens focused on an image 16. Image 16 can be a geographical or topological map, an electrical or mechanical schematic diagram or blueprint, a black-and-white or color photograph, or any other suitable medium for containing an image.

CCD 12 generates a video signal over line 18, which is applied to a CPU 20, such as a conventional personal computer, minicomputer or mainframe computer capable of receiving, processing and storing data, as is well known in the art.

CPU 20 is connected by means of line 22 to a data storage device 24, such as a working or active memory, capable of storing data in discrete and predetermined locations. Active memory 24 may be volatile or non-volatile, depending on the system environment. While active memory 24 is structured in a conventional manner internally with a plurality of storage registers, three regions (24a, 24b and 24c) are depicted in FIG. 1 to facilitate the description of the invention.

Connected to active memory 24, by means of line 26, is a mass data storage medium 28 (such as a non-volatile hard disk pack), for storing a greater quantity of data than could be stored in active memory device 24.

Connected to CPU 20 by means of line 30 is mass data storage device 28 for directly accessing data stored therein.

In operation, regions (not shown) of image 16 are digitized by CCD 12 and CPU 20 and stored in active memory device 24. Specifically, data representative of location, boundary, vertex, and shade of gray or color tone of each region is stored in a respective portion 24a, 24b or 24c of active memory 24. When the quantity of data to be stored exceeds the capacity of active memory 24, or the number of regions to be stored exceeds the available number of active memory regions 24a, 24b and 24c, data is transferred from active memory device 24 to mass data storage device 28.

Figure 2:
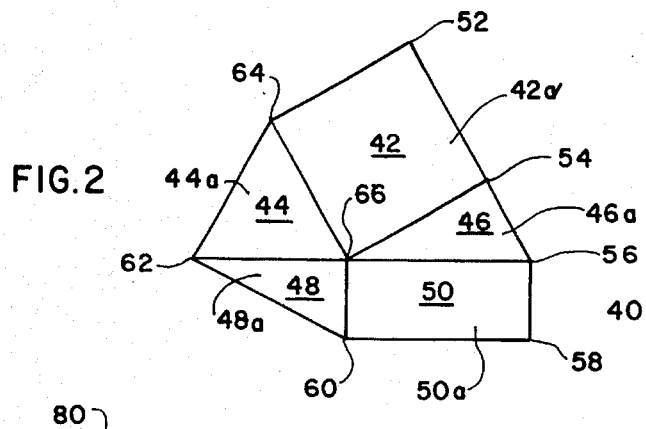
FIG. 2 is a sample image to be stored in accordance with the present inventive method.

Referring now also to FIG. 2, there is shown a sample map 40 that represents one image 16 (FIG. 1) that can be analyzed by image processing system 10.

A plurality of regions 42, 44, 46, 48 and 50 is shown, for simplicity, as regularly-shaped, commonly-bounded polygons, having vertices 52–64 and common vertex 66. One point interior to each region 42–50, respectively, is identified by reference numeral 42a–50a, respectively.

Each region of the map, represented by the commonly bounded polygons can be distinguished in the digitally-stored data by way of assigning various optically shaded values in the form of colors, shades or tones. The boundary of each region can be arbitrarily assigned a color black, and a vertex point a predetermined shade of gray. Interior portions of each region can be distinguished from the boundary and vertex point by respectively assigning them with a shade of gray that is either darker or lighter than the shade of gray assigned to the vertex point.

Figure 3:
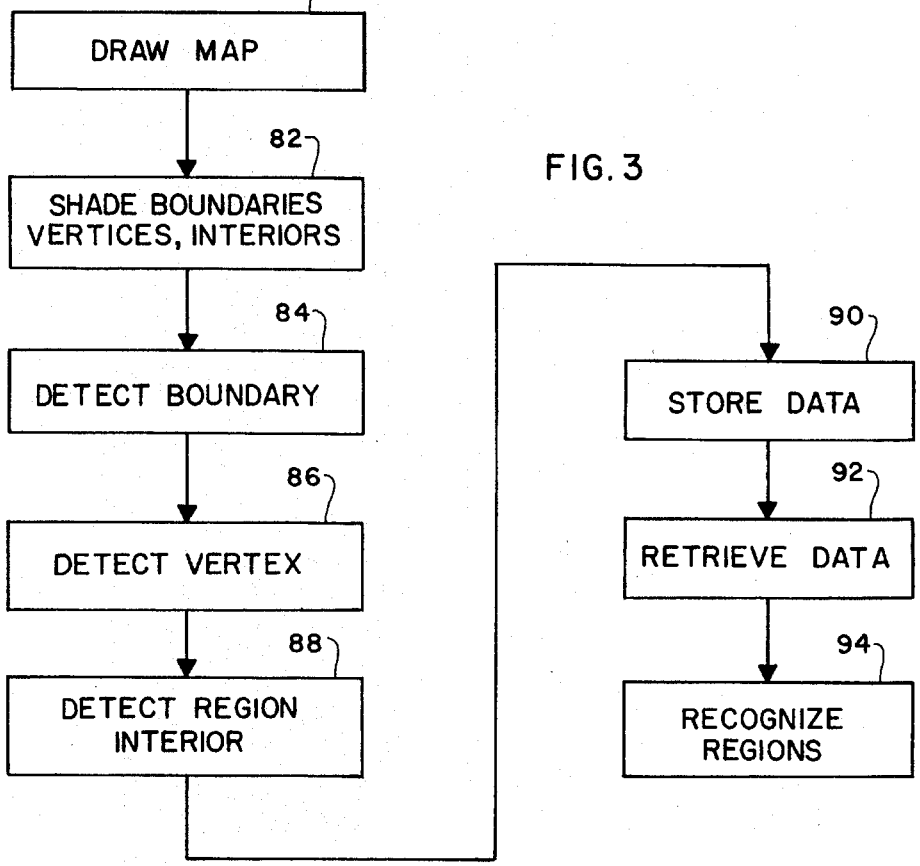
FIG. 3 is a flow chart of operation in accordance with the present inventive system.

Referring now also to FIG. 3, there is shown a flow chart of system operation in accordance with the present invention. Steps 80–82 are performed by a human or a "man-in-the-loop" pre-processing system. In order to store sufficient information to define the position of each region 42–50 in map 40, the following data must be detected, steps 84–88, and stored, step 90: the boundary of each region 42–50 (FIG. 2), at least one interior point 42a–50a thereof, and vertices 52–66. In accordance with the present invention, there is no need to store location or any other information for each pixel of map 40, other than those hereinabove identified.

Once the foregoing appropriate data has been stored in active memory 24 (FIG. 2) and/or mass data storage device 28, step 90, such data can be retrieved, step 92. CPU 20 (FIG. 1) can recognize the various regions associated therewith, step 92, by conventional numerical analysis methods well known in the art, which need not be explained herein.

From the foregoing explanation, what has been disclosed is an efficient method of digitally storing information representative of commonly bounded image regions without requiring coordinate values of each pixel contained therein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A method of redefining a map or image utilizing human intervention to convert said map to a more simplified digital form that is representative of precise locations of commonly bounded, fixed image regions for subsequent storage and retrieval by a machine, the conversion of which is for the purpose of reducing digital information and subsequent storage capacity requirements, said method comprising the steps of:

i) defining regions on an image representing a geographical area in a form requiring a maximum of three digital storage bits for each region of said image, thus reducing storage capacity requirements necessary to store said image;

ii) humanly assigning various optically-shaded values in the form of colors, shades or tones to said regions, including the steps:

a) optically marking said image representing said geographical area so that an interior portion of a region, a boundary and a vertex point of said boundary common to another region on said image can all be distinguished, from one another, said vertex point of said region having fixed coordinate values on said image;

b) optically distinguishing said boundary of said region, said interior portion and said vertex point of said region, from one another by respectively shading them with at least three optically distinctive colors, shades or tones; and c) storing data representative of said marked interior portion of said region, said boundary and said vertex point of said boundary in a storage device for subsequent retrieval by a machine.

2. The method in accordance with claim 1, further comprising the steps of:

d) retrieving said data; and e) recognizing said region as distinguished from other neighboring regions on said map or image.

3. The method in accordance with claim 2, wherein said at least one point of said boundary is a vertex of several neighboring regions.

4. The method in accordance with claim 3, wherein said map or image comprises a schematic diagram.

5. The method in accordance with claim 1, wherein said tones are shades of gray.

6. The method in accordance with claim 5, wherein said boundary is shaded substantially black.

7. The method in accordance with claim 6, wherein said point is shaded with a predetermined shade of gray.

8. The method in accordance with claim 7, wherein an interior portion of a region is shaded lighter than said predetermined shade of gray.

9. The method in accordance with claim 7, wherein an interior portion of a region is shaded darker than said predetermined shade of gray.

10. The method in accordance with claim 1, wherein said tones are colors.

11. The method in accordance with claim 1, wherein said map or image comprises a geographical map.

12. A prescanning data storage method of digitally recoding an image or map by humanly assigning optical values to said image or map, said image or map having a plurality of bounded regions for subsequent retrieval and processing in a data processing system, comprising the steps of:

a) humanly assigning optically-readable values to an image or map by means of:
  (i) shading at least one interior portion of each bounded region in an image or map having a plurality of bounded regions with a first predetermined shade, and
  (ii) shading boundaries of said regions of said image or map with a second predetermined shade;

b) machine-detecting said at least one interior portion and a boundary of said image or map;

c) assigning a first value representative of said at least one interior portion and a second value representative of said boundary, which values correspond to said predetermined humanly-selected shades;

d) storing said first and second values in a data processing system;

e) machine-detecting a vertex point on said boundary;

f) assigning a third value representative of said vertex point, corresponding to a predetermined humanly-selected shade; and g) storing said third value in said data processing system.

13. The method in accordance with claim 12, wherein said first and second predetermined shades are shades of gray.

14. The method in accordance with claim 12, wherein said first and second predetermined shades are shades of gray.

15. A prescanning and storage method requiring a maximum of three digital bits for regions delineated thereon for an image comprising a geographical map having a plurality of regions, the steps comprising: marking an image to create commonly bounded polygons; and digitally storing and thereafter retrieving data obtained by way of humanly assigning various machine-recognizable, optical shades, colors or tones that are represented for machine analysis by digital values corresponding to said colors, shades or tones; wherein a boundary of each region is humanly, arbitrarily assigned a color black, and a vertex point is assigned a predetermined shade of gray with interior portions of each region being distinguished from the boundary and vertex point by humanly assigning them with a shade of gray that is either darker or lighter than the shade of gray assigned to the vertex point, there being a maximum of three digital storage bits for each region, thus reducing storage capacity requirements necessary to store said image.

16. A "main-in-the-loop" method of redefining a map or image in digital form that is representative of precise locations of commonly bounded, fixed image regions for subsequent storage and retrieval, comprising:

a) optically digitizing a map or image to fingerprint an interior portion of a region and a boundary on said map or image, at least one point of said region having a boundary having fixed coordinate values on said map or image, said digitizing providing data that can be easily stored and retrieved, wherein said at least one point of said boundary is a vertex of several neighboring regions;

b) optically distinguishing said boundary of said region, said interior portion and said point of said region, from one another by respectively shading them with at least three optically distinctive tones;

c) storing said data in a boundary file for subsequent retrieval;

d) retrieving said data; and e) recognizing said region as distinguished from other neighboring regions on said map or image.

17. The method in accordance with claim 16, wherein said map or image comprises a schematic diagram.

18. A prescanning method of digitally recoding an image having a plurality of bounded regions for subsequent processing in a data processing system, comprising:

a) manually shading at least one interior portion of each bounded region in an image with a first predetermined shade;

b) manually shading the boundary-separating regions of said image with a second predetermined shade;

c) detecting said at least one interior portion and said boundary;

d) assigning a first value representative of said at least one interior portion and a second value representative of said boundary, which values correspond to said predetermined shades; and e) storing said first and second values in a data processing system.

19. The method in accordance with claim 18, wherein said detecting, assigning and storing operations (c) through (e) are performed by at least one machine.

20. The method in accordance with claim 18, the method further comprising:

f) detecting a vertex on said boundary;

g) assigning a third value representative of said vertex, and corresponding to a predetermined shade; and h) storing said third value in said data processing system.

21. The method in accordance with claim 20, wherein said first and second predetermined shades are shades of gray.

22. The method in accordance with claim 20, wherein said image comprises a geographical map.

23. The method in accordance with claim 18, wherein said first and second predetermined shades are shades of gray.

* * * * *